United States Patent Office 3,475,153
Patented Oct. 28, 1969

3,475,153
PRODUCTION OF AN AMMONIUM PHOSPHATE-AMMONIUM NITRATE FERTILIZER MATERIAL AND CALCIUM SULFATE
Richard L. Abbott and Leonard A. Stengel, Terre Haute, Ind., assignors to Commercial Solvents Corporation, New York, N.Y., a corporation of Maryland
No Drawing. Filed May 12, 1966, Ser. No. 549,457
Int. Cl. C05c 1/00, 3/00, 7/00
U.S. Cl. 71—35
2 Claims

ABSTRACT OF THE DISCLOSURE

An improved process for the production of fertilizer materials and high quality calcium sulfate from the nitric acid acidulation of rock phosphate by adding to the acidulated phosphate sulfate ion to precipitate a portion of the calcium sulfate and thereby coagulate the nitric acid insoluble fraction, separating the insolubles, treating the liquid portion with additional sulfate ion to precipitate the remaining calcium ion, separating the resulting calcium sulfate, and ammoniating the resulting liquid portion to produce a high nitrogen and high phosphate fertilizer material.

---

This invention relates to an improved process for the production of fertilizer materials. In a particular aspect it relates to production of ammonium nitrate and ammonium phosphate mixtures with concomitant production of high quality calcium sulfate (a hydrate of which is known as gypsum) suitable for agricultural and industrial uses.

The present trend in fertilizer production is to provide high analysis fertilizers, i.e. mixtures having a high proportion of nitrogen, phosphorous and potassium, three essential plant food elements. In the production of these fertilizer mixtures, the phosphorous is conveniently supplied by acidulated phosphate rock, which is composed of tricalcium phosphate, usually in the form of fluorapatite, along with varying amounts of impurities. In the acidulation process the rock is finely ground and treated with an acid such as sulfuric acid or nitric acid to produce calcium sulfate or calcium nitrate—depending on the acid used—and dicalcium phosphate, monocalcium phosphate or phosphoric acid itself, depending on the degree of acidulation.

The nitrogen content of mixed fertilizers can be supplied in a variety of ways, usually by adding nitrogenous materials such as protein wastes, urea, nitrate salts and ammonium salts. Ammoniation of acidulated phosphate rock is also employed to provide nitrogen as well as to neutralize excess acidity.

During the process of sulfuric acid acidulation of phosphate rock wherein a sufficient amount of sulfuric acid is used to convert substantially all of the phosphate in the ground phosphate rock into phosphoric acid, the calcium which is displaced from the phosphate rock is present in the insoluble fraction of the resultant mixture as calcium sulfate. Also present in the insoluble fraction is material from the original rock which was not solubilized by the acid. However, because the insoluble fraction is an inert diluent, it is necessary to separate it from the soluble phosphate intended for use in high analysis fertilizers. Separation is usually effected by filtration, or by holding the acidulated phosphate mixture in tanks for a prolonged period to allow the insolubles to settle out after which the solution is decanted. This insoluble fraction has no substantial utility and it accumulates in large volumes creating a serious disposal problem for the manufacturer.

The use of nitric acid in such a process has several advantages over the use of sulfuric acid. For example, it is not necessary to grind the phosphate rock as finely when acidulating with nitric acid as when acidulating with sulfuric acid, thus allowing savings on time and equipment. Another advantage is that the acidulation reaction is much faster with nitric acid than with sulfuric acid, thus greatly increasing production capacity. Still another advantage is that the presence of nitrate ion from nitric acid acidulation leads to higher nitrogen analysis materials in a single step than the sulfuric acid process.

A disadvantage of using nitric acid in such a process is that the calcium from the phosphate rock, instead of being precipitated as calcium sulfate, is converted to soluble calcium nitrate. Although the volume of the insoluble fraction is advantageously reduced thereby, calcium nitrate is highly hygroscopic and can be satisfactorily employed in only relatively small amounts in mixed fertilizers. Otherwise absorption of moisture during storage frequently occurs, resulting in hard caking of the fertilizer.

It is an object of this invention to provide an improved process for the production of fertilizer materials.

Another object is to provide a process for the production of ammonium nitrate and ammonium phosphate concomitantly with high quality calcium sulfate suitable for agricultural and industrial uses.

An improved process has been discovered for the production of ammonium nitrate-ammonium phosphate mixtures and calcium sulfate. The improved process comprises treating the rock phosphate with nitric acid by any suitable process, many of which are known to dissolve the tricalcium phosphate present in the rock. A first increment of sulfate ion source is then added to the resultant solution to precipitate a minor proportion of the calcium ions as calcium sulfate and thereby coagulate the insoluble fraction. The insoluble fraction is separated from the nitrate-phosphate solution and this solution is again treated with a second increment of sulfate ion source to precipitate substantially all of the remaining calcium as calcium sulfate, which is recovered from the nitrate-phosphate solution. The remaining nitrate-phosphate solution is then ammoniated by any suitable process, many of which are known.

The improved process possesses several advantages over the prior nitric acid acidulation process. When nitric acid acidulation is employed, the insoluble fraction is usually more difficult to separate because it is of a gelatinous nature, that is slimy, and therefore more difficult to filter and slower to settle out. However, when a sulfate ion source is added in accordance with this invention the insoluble fraction is coagulated and can be readily removed by filtration, centrifugation, decantation or other suitable means without excessive loss of phosphate or calcium. The remaining calcium is recovered as a relatively pure grade of calcium sulfate suitable for the various market uses. The improved process thus provides a means of utilizing a portion of a previously worthless by-product. Another advantage is that the ammonium phosphate-ammonium nitrate obtained by the process of this invention is substantially free from calcium nitrate and the difficulties deriving therefrom. By use of this process, the advantages of nitric acid acidulation, as described above, accrue to the fertilizer manufacturer. In addition, a method is provided for recovery of the previously discarded calcium sulfate in a relatively pure form as a valuable by-product.

In the practice of this invention, the rock phosphate, preferably ground rock phosphate, is introduced into a reaction vessel resistant to nitric acid and equipped with an agitation means. The rock phosphate is then acidulated with nitric acid by any suitable method, many of which are known. The preferred amount of nitric acid is at least 6 moles per mole of tricalcium phosphate. More preferably, an excess is used. Nitric acid of about 50% concentration is suitable; however, more concentrated acid, such as the 69% by weight commercial grade acid, or more dilute than 50% can be used. The commercial grade acid can be diluted with water, or preferably it is diluted with wash water recycled from the washing steps as described below. The wash water contains some soluble phosphate and nitrate and therefore can be advantageously used for diluting the nitric acid.

The acidulation reaction results in a solution of phosphate, nitrate and calcium compounds, among others, and a suspended, uncoagulated, insoluble fraction which was not dissolved by the nitric acid. When the acidulation reaction is adjudged complete, the first increment of sulfate ions is added to the resultant solution containing phosphate, nitrate and calcium and an insoluble fraction. Any soluble source of sulfate ion can be employed, such as potassium sulfate, ammonium sulfate, sodium sulfate, or sulfuric acid. The preferred sulfate ion source is concentrated sulfuric acid of commerce having a sulfuric acid content of approximately 95%; being a liquid, it can be added directly to the resultant solution without first diluting with water.

The amount of sulfate ion source added varies according to the amount of the insoluble fraction present which in turn varies with the source of phosphate rock. It is preferred to add only sufficient sulfate ions to cause coagulation of the insoluble fraction by the precipitated calcium sulfate. Generally from about 1% to about 15%, preferably from about 3% to about 10% of sulfate calculated as sulfuric acid based on the weight of the phosphate rock is sufficient.

The sulfate ion source is preferably well mixed with the acidulated phosphate solution, and subsequently the insoluble fraction is separated, washed and discarded, leaving a solution containing principally calcium nitrate and phosphate compounds. The separation of the insoluble fraction can be effected by any convenient means, e.g. by filtration, centrifugation or decantation. Filtration is generally preferred. The insoluble fraction may contain appreciable amounts of soluble phosphate and nitrate which can be removed by washing as is known in the art. The washings can be conveniently recycled to the acidulation step to dilute the nitric acid as hereinbefore described.

After separation of the insoluble fraction, a second increment of sulfate ions is added to the liquid fraction in an amount sufficient to precipitate the remaining dissolved calcium as the second portion of calcium sulfate. The quantity of calcium to be precipitated can be readily determined by known analytical methods and the quantity of sulfate ion source required can be readily calculated. One mole of sulfate ion is required for each mole of calcium. It is not necessary to precipitate all of the calcium, however, inasmuch as a minor amount is not objectionable in the final product. Neither is it necessary to avoid an excess of sulfate ions, for a minor amount of sulfate ion source is not objectionable in the final product.

After the remaining calcium is precipitated, the second portion of calcium sulfate is separated, e.g. by filtration, centrifugation or decantation, washed and dried. It is a white, relatively pure product suitable for use as a high-quality gypsum, e.g. in the manufacture of plaster or for agricultural uses. The washings can be conveniently recycled to the acidulation step to dilute the nitric acid as hereinbefore described.

The liquid fraction remaining from separation of the second portion of calcium sulfate consists principally of nitrate ions and phosphoric acid. When sulfuric acid is employed as the sulfate ion source, the nitrate ions are present as nitric acid which, if desired, can be separated by distillation, recovered, and recycled to the acidulation step. This step is particularly advantageous if phosphoric acid or ammonium phosphate is the preferred end product. After removal of the calcium sulfate, the liquid fraction may be neutralized by the addition of ammonia, either aqueous or preferably anhydrous, to form an ammonium nitrate mixture followed by granulation as is known in the art. When the nitric acid is removed prior to the neutralization, ammonium phosphate is formed upon neutralization with $NH_3$, which may also be granulated. The resulting product is then ready for use directly as a high analysis fertilizer or in the manufacture of mixed fertilizers.

The process of this invention is illustrated by the following examples:

EXAMPLE 1

Unground Florida phosphate rock (33.8% $P_2O_5$), 6 kg. (14.3 moles $P_2O_5$) was delivered to a nitric acid-resistant reaction vessel equipped with a nitric acid-resistant mixing means. A glass-lined vessel equipped with a glass-coated beater is an example of a satisfactory acid-resistant apparatus. To the phosphate rock was added 14 kg. of 50% by weight nitric acid (111 moles) accompanied by thorough mixing. After 32 minutes continual mixing the reaction was determined by visual inspection to be substantially complete. The mixture formed a slurry consisting of a slimy, insoluble fraction which did not react with the nitric acid and a solution of calcium and nitrate ions and phosphoric acid. Then 200 g. of 98% sulfuric acid as a sulfate ion source was mixed into the slurry thereby forming insoluble calcium sulfate in the slurry. The insoluble portion of the rock together with the precipitated calcium sulfate was filtered off, washed and discarded. The wash water containing some nitric and phosphoric acid was reserved for future use in diluting nitric acid and the filtrate was returned to the acid-resistant vessel. Additional 98% sulfuric acid, 4.5 kg., was added to and mixed with the filtrate and the remaining calcium was precipitated as relatively pure, white calcium sulfate, which was filtered off, washed and dried and was determined to be suitable for the various market uses. The wash water containing some nitric and phosphoric acid was reserved for future use in diluting nitric acid.

The filtrate obtained in the previous step consisted principally of nitric and phosphoric acids. It was returned to the acid-resistant vessel and anhydrous ammonia was slowly introduced to the solution accompanied by thorough mixing. The addition of ammonia was continued until the pH of the reaction mixture was nearly neutral. During the neutralization step, a substantial proportion of solids crystallized from the solution, forming a hot, thick slurry, which was then granulated in a laboratory granulator to produce a mixture containing primarily ammonium nitrate and ammonium phosphate, having a plant food value of approximately 28–18–0 (i.e. 28% nitrogen, 18% available $P_2O_5$ and 0% $K_2O$).

EXAMPLE 2

Following the general procedure and equipment of Example 1, ground Florida pebble phosphate rock (34% $P_2O_5$ and 42% CaO), 1,000 g., and nitric acid, 900 g. 100% basis diluted to 42% by weight were delivered to the reaction vessel and were well mixed. The mixture was allowed to react for a period of 40 minutes, accompanied by continual mixing, after which the reaction was adjudged by visual inspection to be complete. The reaction mixture consisted of a slurry containing dissolved calcium, nitrate and phosphate and a slimy, insoluble fraction.

To the slurry was added 80 g. of 95% sulfuric acid as the first increment of a sulfate ion source. The slurry was mixed for 20 minutes during which time calcium sulfate formed and precipitated. The insoluble material was then filtered, washed, and discarded.

The clear filtrate containing the calcium, nitrate and phosphate was returned to the reaction vessel and 800 g. of 95% sulfuric acid was added as a sulfate ion source to precipitate calcium as calcium sulfate and providing an excess of sulfuric acid in the solution. The precipitated calcium sulfate was filtered, washed and dried to produce a substantially pure gypsum.

The filtrate, consisting principally of a solution of nitric, sulfuric and phosphoric acids was returned to the reaction vessel and ammoniated by introducing anhydrous ammonia with constant mixing until the pH of the reaction mixture was nearly neutral. During the neutralization with ammonia, a hot slurry was obtained which was subsequently granulated. The resultant granulated fertilizer containing ammonium nitrate, ammonium sulfate and ammonium phosphate had an analysis of 24–18–0.

EXAMPLE 3

Example 2 was repeated except that after ammoniation, sufficient 60% potassium chloride was added to the slurry so that the final granulated fertilizer had a plant food value of 18–12–12. The calcium sulfate filter cake was washed, dried and crushed and determined to be of very good commercial quality suitable for plaster manufacture.

EXAMPLE 4

Example 2 is repeated except that 142 g. of potassium sulfate is employed for the first increment of the sulfate ion source and 1420 g. is employed as the second increment of the sulfate ion source in place of sulfuric acid.

EXAMPLE 5

Example 2 is repeated except that ammonium sulfate is employed for the first increment of the sulfate ion source and 1058 g. is employed as the second increment of sulfate ion source in place of sulfuric acid.

EXAMPLE 6

Example 2 is repeated except that 116 g. of sodium sulfate is employed as the first increment of the sulfate ion source and 1160 g. is employed as the second increment of the sulfate ion source in place of sulfuric acid.

What is claimed is:

1. A process for the production of an ammonium phosphate-ammonium nitrate mixture and by-product calcium sulfate comprising the steps of:
   (a) acidulating rock phosphate with nitric acid in an amount to solubilize substantially all of the phosphate in said rock phosphate thereby producing a solution containing principally calcium ions, nitrate ions, phosphoric acid and an uncoagulated insoluble fraction,
   (b) adding a first increment of sulfuric acid in an amount of from about 1% to about 15% by weight based on the weight of said phosphate rock to precipitate a portion of said dissolved calcium ions as a first portion of calcium sulfate and thereby to coagulate said insoluble fraction,
   (c) separating said calcium sulfate and coagulated insoluble fraction to yield a liquid fraction,
   (d) adding a second increment of sulfuric acid to said liquid fraction obtained in step (c) in an amount of about 1 mole per mole of dissolved calcium present in the liquid fraction, to precipitate a second portion of calcium sulfate comprising substantially all of the said dissolved calcium remaining in said liquid fraction,
   (e) separating and recovering as a by-product the calcium sulfate precipitated in step (d) to yield a second liquid fraction containing nitrate ions and phosphoric acid,
   (f) neutralizing said second liquid fraction obtained in step (e) with ammonia to convert said phosphoric acid and nitrate ions to an ammonium phosphate-ammonium nitrate mixture, and
   (g) granulating said ammonium phosphate-ammonium nitrate mixture.

2. The process of claim 1 wherein the sulfate ion source added in step (b) is sulfuric acid in an amount of from about 3% to about 10% by weight based on the weight of the phosphate rock.

References Cited

UNITED STATES PATENTS

| | | | |
|---|---|---|---|
| 1,083,429 | 1/1914 | Brunschwig | 23—165 |
| 1,788,828 | 1/1931 | Goldberg et al. | 71—35 |
| 1,916,429 | 7/1933 | Larsson | 71—35 |
| 2,885,263 | 5/1959 | Peet | 23—122 XR |

S. LEON BASHORE, Primary Examiner

B. H. LEVENSON, Assistant Examiner

U.S. Cl. X.R.

23—122; 71—36